US012054635B2

(12) United States Patent
Sloot et al.

(10) Patent No.: US 12,054,635 B2
(45) Date of Patent: Aug. 6, 2024

(54) CURABLE COMPOSITION FOR COATINGS HAVING AN ANTI-ADHESIVE PROPERTY

(71) Applicant: Evonik Operations GmbH, Essen (DE)

(72) Inventors: Tim-Frederic Sloot, Haltern am See (DE); Michael Fiedel, Essen (DE); Katrin Roland, Essen (DE); Frauke Henning, Essen (DE); Stefan Busch, Bochum (DE); Sabine Krusenbaum, Essen (DE); Stefanie Redeker, Essen (DE)

(73) Assignee: Evonik Operations GmbH, Essen (DE)

( * ) Notice: Subject to any disclaimer, the term of this patent is extended or adjusted under 35 U.S.C. 154(b) by 99 days.

(21) Appl. No.: 16/142,408

(22) Filed: Sep. 26, 2018

(65) Prior Publication Data
US 2019/0112502 A1 Apr. 18, 2019

(30) Foreign Application Priority Data

Oct. 13, 2017 (EP) .................................... 17196290

(51) Int. Cl.
| | | |
|---|---|---|
| *C09D 183/04* | (2006.01) | |
| *C09D 5/16* | (2006.01) | |
| *C09D 7/63* | (2018.01) | |
| *C09D 183/06* | (2006.01) | |
| *C09D 183/08* | (2006.01) | |
| *C08G 77/14* | (2006.01) | |
| *C08G 77/26* | (2006.01) | |

(52) U.S. Cl.
CPC ......... *C09D 183/04* (2013.01); *C09D 5/1675* (2013.01); *C09D 5/1687* (2013.01); *C09D 7/63* (2018.01); *C09D 183/06* (2013.01); *C09D 183/08* (2013.01); *C08G 77/14* (2013.01); *C08G 77/26* (2013.01)

(58) Field of Classification Search
CPC ......... C09D 183/04; C08G 77/14; C08L 83/04
See application file for complete search history.

(56) References Cited

U.S. PATENT DOCUMENTS

| | | | |
|---|---|---|---|
| 5,281,687 A | 1/1994 | Busch et al. | |
| 5,292,827 A * | 3/1994 | Raleigh ................. | C08G 77/38 525/476 |
| 5,891,969 A * | 4/1999 | Mine .................... | C08G 59/306 257/E23.12 |
| 6,242,554 B1 | 6/2001 | Busch et al. | |
| 6,344,520 B1 * | 2/2002 | Greene ................. | C08G 77/14 525/100 |
| 6,713,586 B2 * | 3/2004 | Greene ................. | C08G 77/14 528/34 |
| 7,619,035 B2 | 11/2009 | Henning et al. | |
| 7,893,128 B2 | 2/2011 | Busch et al. | |
| 8,138,294 B2 | 3/2012 | Henning et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,557,944 B2 | 10/2013 | Henning et al. | |
| 8,598,295 B2 | 12/2013 | Henning et al. | |
| 8,623,984 B2 * | 1/2014 | Henning ............ | C08G 18/4018 521/110 |
| 8,722,834 B2 | 5/2014 | Knott et al. | |
| 8,722,836 B2 | 5/2014 | Knott et al. | |
| 8,729,207 B2 | 5/2014 | Hartung et al. | |
| 8,778,319 B2 | 7/2014 | Herrwerth et al. | |
| 8,779,079 B2 | 7/2014 | Henning et al. | |
| 8,796,198 B2 | 8/2014 | Henning et al. | |
| 8,802,744 B2 | 8/2014 | Knott et al. | |
| 8,946,369 B2 | 2/2015 | Henning et al. | |
| 9,005,361 B2 * | 4/2015 | Henning ................. | C08L 83/12 106/806 |
| 9,175,139 B2 * | 11/2015 | McCormack .......... | C08G 77/20 |
| 9,346,919 B2 | 5/2016 | Jazkewitsch et al. | |
| 9,481,695 B2 | 11/2016 | Knott et al. | |
| 9,751,971 B2 | 9/2017 | Veit et al. | |
| 9,783,656 B2 | 10/2017 | Lehmann et al. | |
| 9,790,327 B2 | 10/2017 | Klotzbach et al. | |
| 9,845,391 B2 | 12/2017 | Lehmann et al. | |
| 9,896,541 B2 | 2/2018 | Fiedel et al. | |
| 10,010,838 B2 | 7/2018 | Favresse et al. | |
| 10,407,592 B2 * | 9/2019 | Amajjahe .............. | C08G 77/08 |
| 10,787,464 B2 | 9/2020 | Fiedel et al. | |
| 10,793,662 B2 | 10/2020 | Günther et al. | |
| 11,021,575 B2 | 6/2021 | Knott et al. | |
| 11,066,429 B2 | 7/2021 | Knott et al. | |

(Continued)

FOREIGN PATENT DOCUMENTS

| | | | |
|---|---|---|---|
| CN | 102428145 B | | 3/2014 |
| CN | 104640946 A | | 5/2015 |
| DE | 202010017915 U1 | | 3/2013 |
| DE | 102012210556 A1 | | 12/2013 |
| EP | 0 646 630 A1 | | 4/1995 |
| EP | 0 802 243 A2 | | 10/1997 |
| EP | 0967253 A2 | | 12/1999 |
| EP | 1 375 568 A1 | | 1/2004 |
| EP | 2159248 | | 3/2010 |
| EP | 2176319 | | 6/2011 |
| EP | 3168273 | * | 5/2017 |
| JP | 2005097332 A | | 4/2005 |
| JP | 2014521758 A | | 8/2014 |

(Continued)

OTHER PUBLICATIONS

Silikopon EF datasheet, Evonik Industries AG, Sep. 2013 (Year: 2013).*

(Continued)

*Primary Examiner* — Margaret G Moore
(74) *Attorney, Agent, or Firm* — Grüneberg and Myers PLLC

(57) ABSTRACT

Curable composition for producing coating systems having an anti-adhesive property containing at least one film-forming polymer and at least one organo-modified, branched siloxane of formula (I) or mixtures thereof.

43 Claims, 1 Drawing Sheet

(56) References Cited

U.S. PATENT DOCUMENTS

| | | | |
|---|---|---|---|
| 2004/0024089 A1* | 2/2004 | Busch | C09D 151/085 523/160 |
| 2006/0281861 A1 | 12/2006 | Putnam | |
| 2008/0021359 A1 | 1/2008 | Beckman et al. | |
| 2010/0029587 A1 | 2/2010 | Brueckner et al. | |
| 2010/0029887 A1* | 2/2010 | Hamamoto | C08G 59/3254 525/403 |
| 2010/0056649 A1* | 3/2010 | Henning | C08G 77/08 521/25 |
| 2010/0249339 A1 | 9/2010 | Henning et al. | |
| 2010/0288963 A1 | 11/2010 | Mitina et al. | |
| 2011/0311830 A1* | 12/2011 | Wade | C09D 163/00 428/447 |
| 2012/0037036 A1 | 2/2012 | Veit et al. | |
| 2012/0282210 A1 | 11/2012 | Henning et al. | |
| 2013/0213267 A1 | 8/2013 | Fiedel et al. | |
| 2013/0222884 A1* | 8/2013 | Moriyama | C09C 3/12 359/296 |
| 2013/0259821 A1 | 10/2013 | Henning et al. | |
| 2014/0134146 A1 | 5/2014 | Olsen et al. | |
| 2014/0135422 A1 | 5/2014 | Thorlaksen et al. | |
| 2014/0170426 A1 | 6/2014 | Thorlaksen et al. | |
| 2014/0256844 A1 | 9/2014 | Henning et al. | |
| 2014/0309446 A1 | 10/2014 | Amajjahe et al. | |
| 2015/0004112 A1 | 1/2015 | Ritter et al. | |
| 2015/0004113 A1 | 1/2015 | Ritter et al. | |
| 2015/0274895 A1 | 10/2015 | Okawa et al. | |
| 2016/0161001 A1 | 6/2016 | Jobe et al. | |
| 2017/0081469 A1 | 3/2017 | Fiedel et al. | |
| 2018/0009954 A1 | 1/2018 | Henning et al. | |
| 2018/0010007 A1 | 1/2018 | Roland et al. | |
| 2018/0258228 A1 | 9/2018 | Amajjahe et al. | |
| 2019/0048228 A1 | 2/2019 | Amajjahe et al. | |
| 2020/0377524 A1 | 12/2020 | Knott et al. | |
| 2020/0377665 A1 | 12/2020 | Knott et al. | |
| 2021/0163687 A1 | 6/2021 | Knott et al. | |
| 2021/0171719 A1 | 6/2021 | Knott et al. | |

FOREIGN PATENT DOCUMENTS

| | | |
|---|---|---|
| WO | 2009/025924 A2 | 2/2009 |
| WO | WO2009065644 A1 | 5/2009 |
| WO | 2010/105938 A1 | 9/2010 |
| WO | 2012100099 A2 | 7/2012 |
| WO | 2013/010747 A1 | 1/2013 |
| WO | 2013/017365 A1 | 2/2013 |
| WO | 2014046308 A1 | 3/2014 |

OTHER PUBLICATIONS

Silres HP 2000 datasheet, Wacker Silicones, (Year: 2020).*
U.S. Appl. No. 15/743,232, filed Jul. 11, 2016.
Knott et al., U.S. Appl. No. 17/297,372, filed May 26, 2021.

* cited by examiner

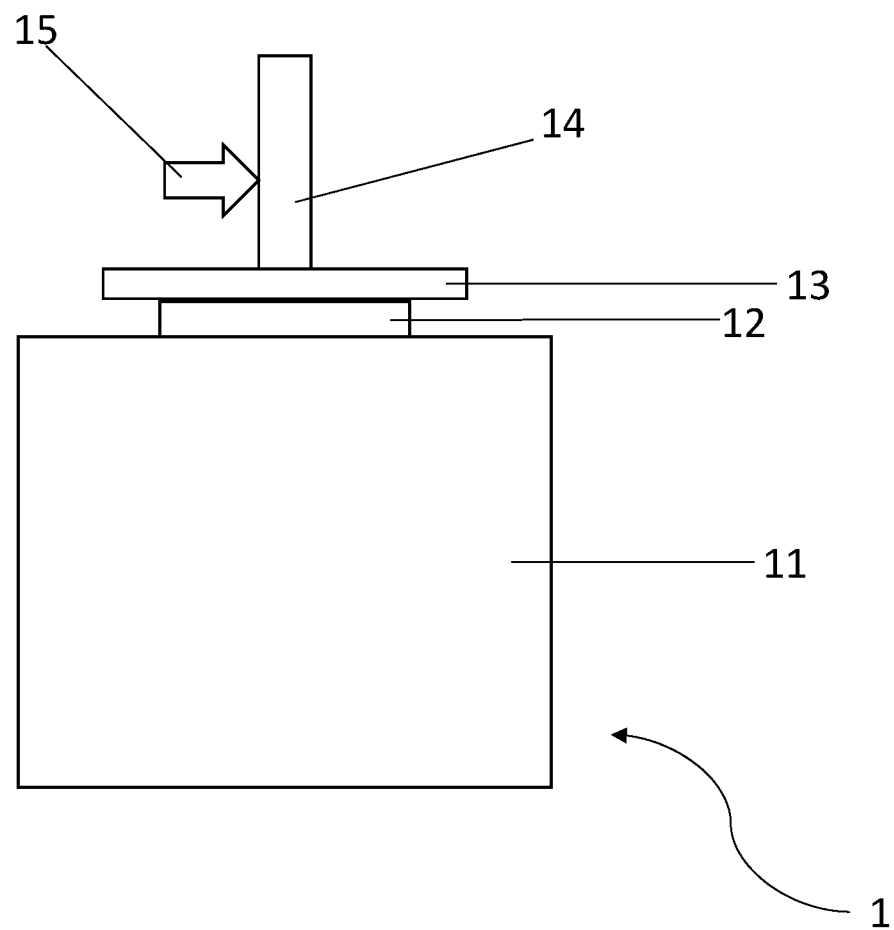

CURABLE COMPOSITION FOR COATINGS HAVING AN ANTI-ADHESIVE PROPERTY

CROSS REFERENCE TO RELATED APPLICATIONS

This application is a 35 U.S.C. § 119 patent application which claims the benefit of European Application No. 17196290.5 filed Oct. 13, 2017, which is incorporated herein by reference in its entirety.

FIELD

The invention relates to curable compositions for producing coatings having an anti-adhesive property, to the use thereof and to a process for application thereof.

BACKGROUND

Coatings are applied atop surfaces for decorative, functional or protective purposes. The demand for surface protection is continually increasing in different industry sectors, such as aerospace, automotive, rail vehicle, shipbuilding and wind energy.

SUMMARY

Various technologies are employed in the functionalization of surfaces and coatings. The approach to surface functionalization by micro- and nanostructuring of coatings derived from the scale structure of sharks is known from the literature. Such surfaces are employed in component parts of ships, aeroplanes, rotor blades of wind energy plants or pipelines to reduce flow resistance. Self-healing coatings have also been developed where upon mechanical damage to the system encapsulated functional active ingredients are released and then develop their healing activity. These self-healing surfaces are of interest for corrosion protection.

DETAILED DESCRIPTION

A further development is the provision of surfaces having reduced ice adhesion/ice formation which are of particular interest not only for the aerospace and wind energy industries but also for the refrigeration technology sector. Employed here are for example high-elasticity coatings having a very low surface energy (e.g. US20060281861A1) or liquid-impregnated coatings (WO2012100099A2).

Also known are antifouling coatings/foul-release coatings which seek to prevent or at least markedly impede algae and bivalve overgrowth of surfaces in constant contact with water. Particularly on structures subjected to permanent irrigation, as for example in the case of ships' hulls, buoys, fishing nets, draw and drain pipes for cooling, offshore drilling installations or water tanks that are exposed to seawater and/or freshwater, the adhesion and growth of organisms (biofouling) causes considerable economic losses. In the case of ships these result for example from increased friction and concomitant increased fuel consumption. Surfaces also suffer from mechanical damage as a result of the increased resistance to waves or flows in the case of static structures, which leads to shorter maintenance cycles and hence also to reduced service life.

Biofilm-inhibiting coatings in technical water systems and production using biocidal active ingredients are known from the prior art.

Surface coatings having a surface with self-polishing properties are known from the prior art.

The self-polishing property can be achieved, inter alia, through the use of degradable polymer coatings which constantly renew their surface by virtue of their continuous degradation characteristics. Such a property of the polymer may have the consequence that a very wide variety of soilings are detached and hence the surface remains free from soiling and unevennesses.

The effectiveness of these coatings was enhanced in combination with substances such as copper oxide, TBT and other biocides, as described in EP 0 646 630, EP 0 802 243. However the use of biocides is subject to restrictions due to ever stricter guidelines.

Foul-release coatings are often based on polysiloxanes or silicone elastomers. The mechanism of action is the formation of an anti-adhesion surface to which aquatic organisms cannot adhere or the adhesive forces are so low that they are detached by the movement in the water.

It is thus known to add polysiloxanes to coatings to achieve particular properties. The use of polysiloxanes is widespread and very multifaceted. Polyhydroxyl-functional polysiloxanes too are in principle known from numerous patent documents.

For example US 2008/0213599 and WO 2009/025924 disclose the use of linear polyorganosiloxanes in coatings based on polyurethanes. In WO 2009/025924 the linear polysiloxanes are reacted with dendritic polyethers to afford "star-like" structures, wherein the linear polysiloxanes are bonded to the polyether in ray-like fashion. However, the coatings produced with such structures exhibit a low hardness and such coatings are therefore not resistant to mechanical stress.

Accordingly, numerous different coating formulations determined for a particular protective function, for a particular binder component and possibly for a particular cross-linker component have been developed from the prior art. These are accordingly tailored with one or two surface functions.

The problem addressed by the present invention was accordingly that of providing a composition exhibiting an improved anti-adhesive activity, wherein said composition is employable in various coatings without significantly impairing the other properties.

It has now been found that, surprisingly, coatings having an anti-adhesive property may be produced with a curable composition containing at least one film-forming polymer and at least one organo-modified, branched siloxane of formula (I)

$$M_a M'_{a1} D_b D'_{b1} T_c Q_d \qquad \text{Formula (I)}$$

where
$M = (R^1{}_3 SiO_{1/2})$
$M' = (R^2 R^1{}_2 SiO_{1/2})$
$D = (R^1{}_2 SiO_{2/2})$
$D' = (R^2 R^1 SiO_{2/2})$
$T = (R^3 SiO_{3/2})$
$Q = (SiO_{4/2})$
a=0 to 30, preferably 0 to 12
a1=0 to 30, preferably 0 to 12, with the proviso that a+a1>2,
b=10 to 1000, preferably 30 to 900, in particular 50 to 800;
b1=0 to 30, preferably 1 to 15, with the proviso that a1+b1>0,
c=0 to 30, preferably 0 to 20, d=0 to 15, preferably 0 to 12, with the proviso that c+d>=1, $R^1$=independently of one another identical or different linear or branched, optionally aromatic hydrocarbon radicals having 1 to 30 carbon atoms, preferably methyl, ethyl, phenyl, dodecyl or hexadecyl, in particular methyl, $R^2$=independently of one another identical or different organic alkyl, polyether, hydroxyl, amine, carboxyl, alkoxy, epoxy, alkylalkoxysilylalkyl or alkoxysilylalkyl radicals, $R^3$=R1 or R2, preferably methyl, phenyl or alkoxy radicals, in particular methyl radicals, or mixtures thereof.

The term "anti-adhesive property" is to be understood as meaning the property of coatings which prevent or at least reduce the adhesion of soiling of any type.

In the context of the present invention "soiling" is to be understood as meaning all types of undesired contamination of surfaces with solid and/or liquid substances, organic and/or inorganic substances. Examples of soiling include fats, oils, proteins, foods, dust or earth but also ice, biofouling, algae, microorganisms, graffiti, soot, staining liquids such as red wine, sunscreen.

It was found in the tests that the coatings produced with the curable composition according to the invention prevent or reduce soiling adhesion of any type and show no impairment of other properties.

The siloxanes of formula (I) present in the curable composition according to the invention may preferably be obtained by initially liquid (considered at a temperature of 25° C. and a pressure of 101 325 Pa), branched SiH-functional siloxanes being produced when initially a mixture containing a) one or more SiH-functional siloxanes,
b) one or more SiH-function-free siloxanes and
c) one or more tetraalkoxysilanes
and/or
d) one or more trialkoxysilanes is reacted in one process step with addition of water and in the presence of at least one solid Brønsted-acidic catalyst selected from acidic ion exchangers. The reaction may be effected according to the process described in EP 2 159 248 B1 or EP 2 176 319 B1. The recited documents are hereby referred to explicitly.

The process must be performed such that the reaction is not complete so that branched siloxane products still comprising alkoxy groups are obtained. This may be achieved for example when the reaction is terminated before complete conversion has been attained or when the input materials are employed in substoichiometric ratios so that not all of the alkoxy groups of the alkoxysilanes can be converted. In particular a molar ratio of water to alkoxy groups of less than 1 to 1 is used; a molar ratio of water to alkoxy groups of less than 0.5 to 1 is particularly preferred.

The preferred process preferably completely avoids solvents not miscible with water in equal weight fractions without phase separation. In particular no alkanes or aromatic compounds are employed as solvents in the process.

It may be advantageous when in the process instead of water a mixture of water and one or more organic solvents miscible with water in equal weight fractions without phase separation is added. In this way a better compatibilization and thus better commixing of the water with the siloxanes and silanes may be achieved. However, good commixing may also be achieved when the water is added with particularly good mechanical commixing or is supplied to the mixture of silanes and siloxanes in the form of vapour, for example by sparging of water steam into the mixture.

Preferably employed as organic solvents miscible with water in equal weight fractions without phase separation are alcohols, in particular alcohols having 1 to 6 carbon atoms, preferably monohydric alcohols and particularly preferably methanol or ethanol, in particular ethanol. It is preferable to add an amount of this solvent such that the water is entirely or partly homogenized in the reaction mixture. If a mixture of water and such a solvent, such as in particular ethanol, is employed the weight ratio of water to solvent in this mixture is preferably from 1:1 to 10:1, preferably 2:1 to 5:1.

It is preferable when the siloxanes of formula (I) comprise identical or different radicals $R^2$ selected from the group

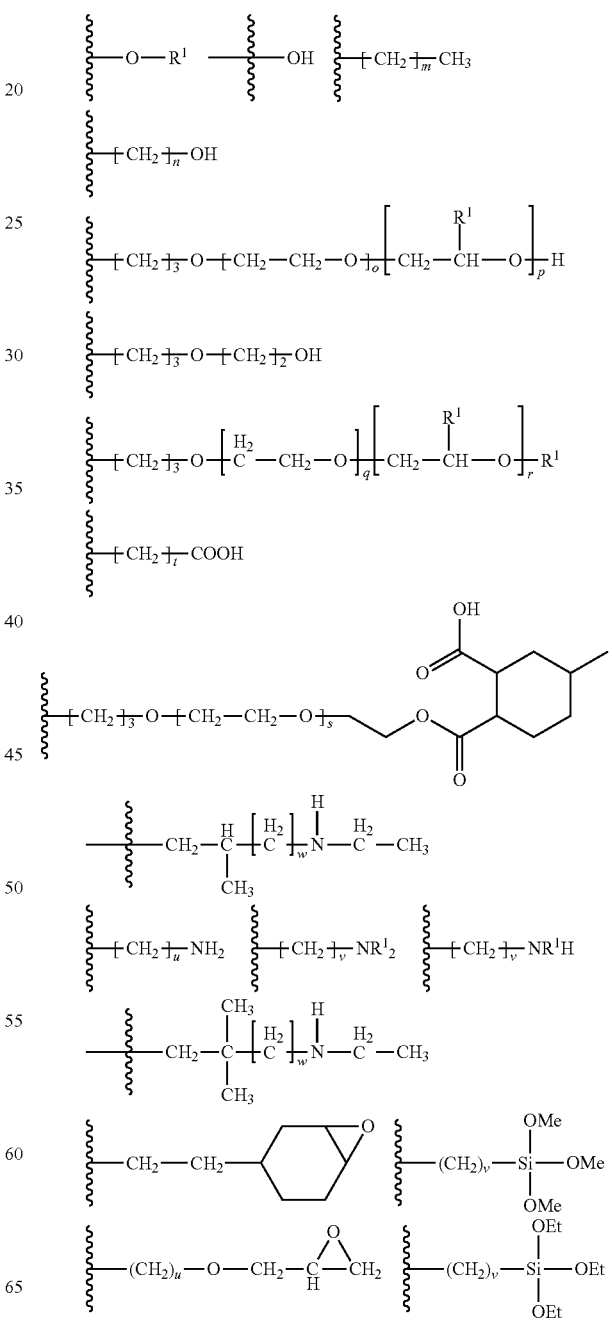

-continued

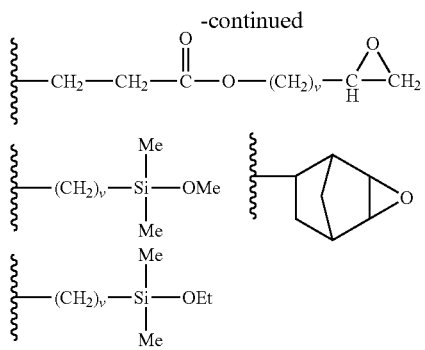

where
m=6 to 20, preferably 8 to 18,
n=2 to 18, preferably 4 to 8,
o=0 to 30, preferably 2 to 20, in particular 5 to 15,
p=0 to 30, preferably 0 to 10,
q=0 to 30, preferably 2 to 20, in particular 5 to 15,
r=0 to 30, preferably 0 to 10,
s=0 to 10, preferably 1 to 5,
t=1 to 20, preferably 1 to 10,
u=1 to 10, preferably 2 to 4,
v=1 to 10, preferably 2 to 5,
w=1 to 6, preferably 1 to 3.

The various fragments of the siloxane chains specified in the formula (I) may have a statistical distribution. Statistical distributions may have a blockwise construction with any number of blocks and any sequence or be subject to a randomized distribution, they may also have an alternating construction or else form a gradient along the chain, in particular they can also form any hybrid thereof.

The indices recited herein and the value ranges for the indicated indices can be understood as meaning average values for the possible statistical distribution of the actual existing structures and/or mixtures thereof. This also applies to structural formulae reproduced per se exactly as such, for example formula (I).

The word fragment "poly" encompasses in the context of this invention not just compounds having at least 3 repeating units of one or more monomers in the molecule, but in particular also compositions of compounds having a molecular weight distribution and having an average molecular weight of at least 200 g/mol. This definition takes account of the fact that it is customary in the field of industry in question to refer to such compounds as polymers even if they do not appear to conform to a polymer definition as per OECD or REACH guidelines.

Unless stated otherwise, percentages are figures in percent by weight.

If measured values are reported hereinbelow, these measurements, unless stated otherwise, have been conducted under standard conditions (25° C. and 1013 mbar).

When average values are reported below, the values in question are weight averages, unless stated otherwise.

The siloxanes of formula (I) are preferably organo-modified siloxanes singly or multiply branched in the siloxane part.

The siloxanes of formula (I) chosen for the curable composition according to the invention have both laterally modified siloxanes and α,ω-modified siloxanes. Accordingly, there is a higher degree of modification, in the sense of a greater number of substitution options, compared to purely linear structures. This makes structures having a long uninterrupted siloxane backbone accessible; the greater number of functional groups in the siloxanes can in coatings result in a higher crosslinking density and thus in a higher resistance with the film-forming polymer. It was also observed that the compatibility with the film-forming polymer was improved. As a result of the uninterrupted, branched silicone core the coatings produced with the curable composition according to the invention can additionally afford a pronounced anti-adhesive activity.

The siloxanes of formula (I) preferably have terminal and/or lateral organic radicals selected from OH-bearing organic radicals, carboxylate groups, allyl glycidyl ether groups, hydroxyethylpropyl groups, alkoxysilylalkyl groups, dodecyl groups or aminoalkyl groups.

The siloxanes of formula (I) are preferably modified singly branched (so-called mono-T or mono-Q structures) or multiply branched (so-called multi-T or multi-Q structures) polysiloxanes, wherein these may be modified by terminal or lateral OH-bearing organic radicals or carboxylate groups or allyl glycidyl ether groups or hydroxyethylpropyl groups or alkoxysilylalkyl groups or dodecyl groups or aminoalkyl groups. Such structures and the production thereof are described for example in WO 2011/088937 A1, EP 2 176 319 B1 and EP 2 159 248 B1 and may be employed.

In the context of the present invention the average degree of branching K is to be understood as meaning the ratio of the number of M and M' units to T and Q units (M+M')/(T+Q). The description of the units corresponds to the internationally recognized nomenclature such as may also be found for example in Thieme Römpp Online, Georg Thieme Verlag, 2008. The degree of branching is determined by forming the ratio of the area integrals of the peaks in a 29Si-NMR spectrum that have been assigned to the respective units.

It is preferable when the average degree of branching K of the siloxanes according to formula (I) is greater than 1, preferably greater than 1.25.

In the context of the present invention the factor F1 is to be understood as meaning the number of directly successive D units (D+D')/(1+T*2+Q*3). Said number indicates the silicone character of the siloxanes of formula (I). F1 is determined by forming the ratio of the area integrals of the peaks in a 29Si-NMR spectrum that have been assigned to the respective units.

It is preferable when the siloxanes of formula (I) have an average number of directly successive D units F1 of at least 5, preferably at least 10.

It is likewise preferable when the siloxanes of formula (I) have an average molecular weight of 2500-70 000 g/mol, preferably 5000-50 000 g/mol, particularly preferably 7000-35 000 g/mol.

It is preferable when the siloxanes of formula (I) have a viscosity of 50-2000 mPa s (25° C.), preferably of 100-1500 mPa s (25° C.), particularly preferably of 150-1000 mPa s (25° C.), measured according to DIN 53015.

The organic terminal or lateral modifications are preferably selected from the group of propyl glycidyl ether groups, hydroxyethylpropyl groups, alkoxysilylalkyl groups, dodecyl groups or aminopropyl groups.

It is preferable when the film-forming polymer contains functional groups reactive with an isocyanate-containing curing agent, an amine-containing curing agent or with a catalyst.

The film-forming polymer is preferably selected from the group of hydroxyl-functional acrylate polymers, polyester polymers, polyurethane polymers and/or polyether polymers, hydroxyl-functional polysiloxanes or hydroxyl-functional fluorine-containing polymers, polyoxypropyleneamines, amino-functional acrylate polymers or polyester polymers and polycarbamates reactive with an isocyanate-containing curing agent.

Such polymers typically have reactive hydroxyl or amine groups. It is particularly preferable to employ polymers having a plurality of hydroxyl-functional groups. Hydroxyl-functional acrylates are obtainable inter alia from Allnex under the trade name MACRYNAL® or SETALUX®. Fluorine-containing hydroxyl-functional film-forming polymers are commercially available under the trade name LUMIFLON® or FLUORAD®. Examples of hydroxyl-functional polyesters are inter alia commercially available under the trade name DESMOPHEN® or SETAL®. Usable and commercially available hydroxyl-functional polyethers are inter alia obtainable under the trade name TERATHANE® or POLYMEG®.

Preference is given to film-forming amine-functional polymers likewise suitable for curing with isocyanate-containing curing agents. Examples of commercially available products are inter alia polyoxypropyleneamines obtainable under the trade name JEFFAMINE®. Further amine-functional polymers, for example amino-functional acrylate polymers or polyester polymers and polycarbamates are likewise usable and known to those skilled in the art.

The isocyanate-containing curing agents are preferably mono, di- and/or trifunctional isocyanates.

Examples of isocyanate-containing curing agents are monomeric isocyanates, polymeric isocyanates and isocyanate prepolymers. Polyisocyanates are preferred over monomeric isocyanates on account of their lower toxicity. Examples of polyisocyanates are isocyanurates, uretdiones and biurets based on diphenylmethane diisocyanate (MDI), toluene diisocyanate (TDI), hexamethylene diisocyanates (HDI) and isophorone diisocyanate (IPDI). Examples of commercially available products are under the trade name DESMODUR® from Covestro or VESTANAT from Evonik Industries. Examples of polyisocyanates are DESMODUR® N3400, DESMODUR® N3300, DESMODUR® N3600 DESMODUR® N75, DESMODUR® XP2580, DESMODUR® Z4470, DESMODUR® XP2565 and DESMODUR® VL from Covestro. Further examples are VESTANAT® HAT 2500 LV, VESTANAT® HB 2640 LV or VESTANAT® T 1890E from Evonik Industries. Examples of isocyanate prepolymers are DESMODUR® E XP 2863, DESMODUR® XP 2599 or DESMODUR® XP 2406 from Covestro. Further isocyanate prepolymers known to those skilled in the art may be employed.

It is preferable when the film-forming polymer is selected from the group of epoxy-functional silane or siloxane, aromatic or aliphatic glycidyl ethers or condensates thereof or mixtures thereof reactive with an amine-containing curing agent.

Preferred epoxy-functional compounds are the epichlorohydrin-derived glycidyl ethers, glycidyl esters and glycidylamines, particularly preferably bisphenol A diglycidyl ether, bisphenol F diglycidyl ether, glycidyl ethers of novolaks (epoxy-novolak resins), hydrogenated bisphenol A diglycidyl ether, hydrogenated bisphenol F diglycidyl ether, phenyl glycidyl ether, cresyl glycidyl ether, tert-butyl glycidyl ether, diglycidylaniline, tetraglycidylmethylenedianiline, triglycidylaminophenol, 1,6-hexane diglycidyl ether, 1,4 butane diglycidyl ether, cyclohexanedimethyl diglycidyl ether, alkyl glycidyl ethers, benzyl glycidyl ether, trimethylolpropane triglycidyl ether, pentaerythritol tetraglycidyl ether, brominated glycidyl ethers such as tetrabromobisphenol A diglycidyl ether, alkyl glycidyl esters, triglycidyl isocyanurate, allyl glycidyl ether, poly(alkylene glycol) diglycidyl ethers, and epoxide compounds of unsaturated hydrocarbons and unsaturated fats and/or fatty acids. Likewise particularly preferred are oligomeric and polymeric epoxide compounds selected from epoxide-bearing polyolefins and siloxanes or epoxide compounds formed by chain extension preferably from diglycidyl ethers with OH-functional compounds. Particularly preferred are epoxide compounds having two or more than two epoxide groups per molecule.

Epoxy-functional siloxanes are commercially available inter alia from Evonik Industries under the trade name TEGOMER® E-Si 2330 or from ShinEtsu under the trade names KF-105, X22-163 a, X22-163 b, X22-163 c, X22-169 As, X22-169 B or Dow Corning Toray AY 42-119, BY 16-760, BY 16-839, BY 16-869, BY 16-870, BY 16-877. Epoxy compounds are commercially available inter alia from Momentive/Hexion under the trade names Epon, Eponex, Epalloy and from Ipox Chemicals under the trade names ipox ER, ipox CL and ipox RD. Chemically bonded epoxy-siloxane resins are obtainable inter alia from Evonik industries under the trade name SILIKOPON®.

The amine-containing curing agents are preferably amino-functional alkoxysilanes or organic amino-functional compounds or mixtures thereof.

Preferred amino-functional alkoxysilanes are amino-functional mono-, di- or trialkoxysilanes. Such amino-functional alkoxysilanes are commercially available, for example under the trade names Dynasylan® (Evonik Industries AG), Silquest® (Momentive), KBE903, KBM903, KBM603, KBE603, KBM602 (ShinEtsu), Geniosil® (Wacker Chemie) or Z-6011, AZ-720, Z-6610, Z-6015, Z-6020Z, Z-6094, Z-6021, 1-6436Z-6023, AY43-009 (Dow Corning).

Preferred organic amino-functional compounds may be for example aliphatic amines, aliphatic amine adducts, polyamidoamines, cycloaliphatic amines, cycloaliphatic amine adducts, aromatic amines, Mannich bases or ketimines. Examples of usable amino-containing curing agents are commercially available under the trade names D.E.H.® from Olin or ANCAMINE® and ANCAMIDE® from Evonik Industries.

It is preferable when the film-forming polymer is a film-forming alkoxysilyl-containing polymer which cures by the mechanism of hydrolysis condensation. The hydrolysis condensation may particularly preferably be accelerated in combination with at least one catalyst.

These polymers are typically silicone resins, silicone resin intermediates or silane-modified organic resins.

Examples of alkoxy-functional branched methyl and methyl/phenyl silicone resins are obtainable from Dow Corning under the trade names Dow Corning® US-CF 2403 Resin, US-CF 2405 Resin, 3037 Intermediate, 3074 Intermediate. Silanol-functional methyl/phenyl resins are marketed under the trade names RSN-0409 HS Resin, RSN-0431 HS Resin, RSN-0804 Resin, RSN-0805 Resin, RSN-0806 Resin, RSN-0808 Resin, RSN-0840 Resin.

It is preferable when the silane-modified organic resins are silane-terminated polyethers, polyurethanes or silane-urethane hybrid resins. Examples of silane-terminated polyethers are obtainable inter alia under the trade name TEGOPAC® Bond or Polymer ST from Evonik Industries. Silane-terminated polyurethanes are commercially available from Covestro under the trade name DESMOSEAL® S XP. Examples of silane-urethane hybrid resins are products having the trade name VESTANAT® EP-M or VESTANAT® EP-MF obtainable from Evonik industries.

Further film-forming polymers are polyester, alkyd, colophony, maleate, epoxide and melamine-formaldehyde and polyurea, silicone, epoxy acrylate, acrylic, methacrylic, silyl acrylate and silyl methacrylate copolymers, fluoropolymers and bitumen, wherein these may be in the form of a dispersion, emulsion, solution or concentrate. It is also conceivable to employ these for the curable composition according to the invention. It is likewise known to those skilled in the art to select suitable further components for promoting film forming.

It is preferable when the compositions according to the invention contain further additives selected from the group of catalysts, crosslinkers, plasticizers, fillers, solvents, adhesion promoters, rheology additives, stabilizers and drying agents, in particular chemical moisture drying agents.

Preferably employed are catalysts selected from the group of organotin catalysts, titanates or zirconates, organometallic compounds of aluminium, iron, calcium, magnesium, zinc or bismuth, Lewis acids or organic acids/bases, linear or cyclic amidines, guanidines or amines or a mixture thereof.

Preferably employed as curing catalysts are organic tin compounds, for example, dibutyltin dilaurate, dibutyltin diacetylacetonate, dibutyltin diacetate, dibutyltin dioctoate, or dioctyltin dilaurate, dioctyltin diacetylacetonate, dioctyltin diketanoate, dioctylstannoxane, dioctyltin dicarboxylate, dioctyltin oxide, preferably dioctyltin diacetylacetonate, dioctyltin dilaurate, dioctyltin diketanoate, dioctylstannoxane, dioctyltin dicarboxylate, dioctyltin oxide, more preferably dioctyltin diacetylacetonate and dioctyltin dilaurate. Also employable, moreover, are zinc salts, such as zinc octoate, zinc acetylacetonate and zinc-2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, particular preference to that of zinc octoate. More preferred are bismuth catalysts, e.g. TIB Kat (TIB Mannheim) or Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds, such as calcium disodium ethylenediaminetetraacetate or calcium diacetylacetonate, or else amines, examples being triethylamine, tributylamine, 1,4-diazabicyclo[2.2.2]octane, 1,8-diazabicyclo[5.4.0]undec-7-ene, 1,5 diazabicyclo[4.3.0]non-5-ene, N,N-bis(N,N-dimethyl-2-aminoethyl)methylamine, N,N-dimethylcyclohexylamine, N,N dimethylphenylamine, N-ethylmorpholine, etc. Also preferred as catalysts are organic or inorganic Brønsted acids such as acetic acid, trifluoroacetic acid, methanesulfonic acid, p-toluenesulfonic acid or benzoyl chloride, hydrochloric acid, phosphoric acid and the monoesters and/or diesters thereof, for example butyl phosphate, (iso)propyl phosphate, dibutylphosphate, etc. Also preferred are guanidine-bearing organic and organosilicon compounds. It is of course also possible to use combinations of two or more catalysts. In addition, it is also possible to use photolatent bases as catalysts, as described in WO 2005/100482.

The curing catalyst is used in amounts of 0.01% to 5.0% by weight, preferably 0.05% to 4.0% by weight and particularly preferably 0.1% to 3% by weight based on the total mass of the curable composition.

It may be advantageous for the curable composition to comprise a crosslinker of formula (II)

$$R^4_e Si(OR^5)_f \quad \text{formula (II)}$$

with the proviso that $0 \leq e \leq 2$, $0 \leq f \leq 4$ and $e+f=4$,
$R^4$=independently of one another an alkyl group or cycloalkyl group having 1 to 8 carbon atoms or an aromatic group having 6 to 20 carbon atoms or an amino alkyl group
$R^5$=independently of one another an alkyl group having 1 to 8 carbon atoms, preferably a methyl, ethyl, propyl or isopropyl group.

Alkyl groups may for example be methyl, ethyl, propyl, isopropyl, n-butyl, sec-butyl and tert-butyl group. An aromatic moiety may be a phenyl moiety, for example. Preferred substituents $R^5$ are methyl or phenyl or mixtures of methyl and phenyl where the Ph:Me ratio may be in the range from 0:1 to 1:0.

The proportion of the crosslinkers in the curable compositions according to the invention is preferably from greater than 0% to 5% by weight, preferably from 0.2% to 3% by weight, based on the employed amount of alkoxysilyl-bearing polymers.

It may be advantageous when the curable composition comprises a drying agent, for example for binding moisture or water introduced by formulation components or introduced subsequently by the filling operation or by storage. Drying agents employable in the curable compositions in principle include any drying agents known from the prior art. Preferred chemical drying agents include vinyltrimethoxysilane (Dynasylan® VTMO, Evonik or Geniosil® XL 10, Wacker), vinyltriethoxysilane (Dynasylan® VTEO, Evonik or Geniosil® GF 56, Wacker), N-trimethoxysilylmethyl-O-methylcarbamate (Geniosil® XL 63, Wacker), N-dimethoxy(methyl)silylmethyl-O-methylcarbamate, N-methyl[3-(trimethoxysilyl)propyl]carbamate (Geniosil® GF 60, Wacker), vinyldimethoxymethylsilane (Geniosil® XL 12, Wacker), vinyltris(2-methoxyethoxy)silane (Geniosil® GF 58, Wacker), bis(3-triethoxysilylpropyl)amine (Dynasylan® 1122, Evonik), bis(3-trimethoxysilylpropyl)amine (Dynasylan® 1124), N-dimethoxy(methyl)silylmethyl O-methylcarbamate (Geniosil® XL 65, Wacker) or oligomeric vinylsilanes, for example Dynasylan® 6490 and Dynasylan® 6498 (both available from Evonik), alone or mixtures thereof. The drying agents are more preferably selected from vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker). In addition, it may be advantageous when a physical drying agent, such as preferably zeolite, molecular sieve, anhydrous sodium sulfate or anhydrous magnesium sulfate, is used additionally or alternatively to chemical drying.

The proportion of the drying agents in the curable compositions according to the invention is preferably from greater than 0% to 5% by weight, preferably from 0.2% to 3% by weight, based on the employed amount of alkoxysilyl-bearing polymers.

Employment of solvents may also be useful. These solvents may serve, for example, to lower the viscosity of the uncrosslinked binder, or may facilitate application onto the surface. Solvents contemplated include in principle all solvents and also solvent mixtures. The choice of a suitable solvent may be made from the group of the alkanes, alkenes, alkynes, benzene and aromatics with aliphatic and aromatic substituents, carboxylic esters, linear and cyclic ethers and, at high pressures, carbon dioxide as well, halogenated aliphatic or aromatic hydrocarbons, ketones or aldehydes, lactones (γ-butyrolactone), lactams (e.g. N-methyl-2-pyrrolidone), nitriles, nitro compounds, tertiary carboxamides (dimethylformamide), urea derivatives such as tetramethylurea or dimethylpropyleneurea (DMPU), sulfoxides such as dimethyl sulfoxide (DMSO), sulfones such as sulfolane, carbonic esters such as dimethyl carbonate or ethylene carbonate. Mention may also be made of protic solvents such as water, methanol, ethanol, n- and isopropanol and other alcohols, primary and secondary amines, carboxylic acids and esters thereof, and also anhydrides, primary and secondary amides such as formamide. Preference is given to solvents accepted in coating applications such as ethers, e.g. t-butyl methyl ether, esters, for example ethyl acetate or n-butyl acetate, tert-butyl acetate or diethyl carbonate, and alcohols, for example ethanol and the various regioisomers of propanol and butanol. Preferred solvents also include aromatic and/or aliphatic solvents such as benzene, toluene or naphtha cuts.

It is also possible to add, if required, one or more substances selected from the group comprising co-cross-linkers, flame retardants, deaerating agents, curing accelerators for the amine-epoxide reaction, antimicrobial and preservative substances, dyes, colourants and pigments, antifreeze agents, fungicides and/or reactive diluents and also complexing agents, spraying assistants, wetting agents, fragrances, light stabilizers, free-radical scavengers, UV absorbers and stabilizers, especially stabilizers to counter thermal and/or chemical stress and/or stress caused by ultraviolet and visible light.

UV stabilizers are preferably known products based on hindered phenolic systems or benzotriazoles. Light stabilizers used may be, for example, those known as HALS amines. Employable stabilizers include for example the products or product combinations known to those skilled in the art comprising for example Tinuvin® stabilizers (BASF), for example Tinuvin® stabilizers (BASF), for example Tinuvin® 1130, Tinuvin® 292 or else Tinuvin® 400, preferably Tinuvin® 1130 in combination with Tinuvin® 292. The amount in which they are used is determined by the degree of stabilization required.

Suitable for colouring in coatings are pigments based on titanium dioxide and other white pigments, inorganic colour pigments, for example, iron oxides, chromium pigments, ultramarine pigments, organic colour pigments such as azo pigments, phthalocyanine pigments, perylene pigments, quinacridone pigments, also carbon blacks. To improve corrosion protection typical anticorrosion pigments such as for example zinc phosphate are also employed.

Fillers are preferably precipitated or ground chalk, inorganic carbonates in general, precipitated or ground silicates, precipitated or fumed silicas, glass powders, hollow glass beads (called bubbles), metal oxides, for example $TiO_2$, $Al_2O_3$, natural or precipitated barium sulfates, quartz flours, sand, aluminium trihydrates, talc, mica, cristobalite flours, reinforcing fibres, such as glass fibres or carbon fibres, long-fibre or short-fibre wollastonites, cork, carbon black or graphite. Hydrophobized fillers may be advantageously employed, since these products have a lower water ingress and improve the storage stability of the formulations.

It is conceivable to provide the composition according to the invention as 2K systems. Here, the film-forming polymers are provided separately from the curing agents or catalysts. The provision of the composition according to the invention can be adapted from the already existing production process of the respective coating.

It is known to those skilled in the art that further variants of the composition are possible. They must in each case be adapted to the processing particularities in production and use.

It is preferable when the siloxanes of formula (I) are employed in concentrations of 0.1% by weight to 40% by weight, preferably 1% by weight to 35% by weight and particularly preferably 2% by weight to 20% by weight based on the curable composition.

The invention further provides for the use of the curable composition for producing coatings having anti-adhesive properties, for example anti-soiling properties/easy-to-clean properties, anti-graffiti properties, anti-icing properties or anti-fouling properties.

The use of organo-modified, branched siloxanes of formula (I) or mixtures thereof as a universal anti-adhesive additive, preferably as an anti-fouling additive, anti-soiling additive/easy to clean additive, anti-icing additive or anti-graffiti additive is also a further invention.

The invention further provides a process for forming an anti-adhesive coating on a substrate comprising applying a curable film-forming composition atop the substrate, comprising:
(a) at least one film-forming polymer containing functional groups reactive with an isocyanate-containing curing agent, with an amine-containing curing agent or with a catalyst,
(b) at least one organo-modified, branched siloxane according to formula (I) or mixtures thereof and
(c) a curing agent containing isocyanate-functional or amino-functional groups or a catalyst.

It is preferable when the siloxane (b) has a number-average molecular weight of 2500-70 000 g/mol, preferably 5000-50 000 g/mol, particularly preferably 7000-35 000 g/mol.

It is preferable when the siloxane (b) is present in the curable film-forming composition in an amount from 0.1% by weight to 40% by weight, preferably 1% by weight to 35% by weight and particularly preferably 2% by weight to 20% by weight.

The curable film-forming composition is preferably cured at ambient temperature.

The substrate preferably contains metal, concrete, wood, plastic and/or glass fibre and/or carbon fibre composite.

The substrate preferably comprises a ship's hull, underwater structures and/or oil drilling platforms.

It is preferable when an undercoat and/or film-forming top coat composition is applied atop the substrate before application of the curable film-forming composition.

Components employed in the process, such as film-forming polymers, curing agents, catalysts, siloxanes, relate to the same component as in the curable composition according to the invention.

The present invention also further provides coatings containing at least one organo-modified, branched siloxane of formula (I) as a universal anti-adhesive additive, preferably as an anti-fouling additive, anti-soiling additive, anti-icing additive or anti-graffiti additive.

The subject-matter of the invention will be described by way of example below, without any intention that the invention be restricted to these illustrative embodiments.

EXAMPLES

General Conditions

Where % figures are given in the context of the present invention, the figures in question are in weight % unless stated otherwise. In the case of compositions, the % figures are based on the entire composition unless stated otherwise. Where averages are reported hereinafter, these are number averages unless stated otherwise. Where measurement values are reported hereinafter, these values, unless stated otherwise, have been determined under a pressure of 101 325 Pa, at a temperature of 23° C. and the ambient relative atmospheric humidity of about 40%.

Application

Application of the compositions is generally effected by spray application, but may also be applied by other application techniques such as, for example, brushing, rolling, flow coating, dipping, wiping and pouring. Suitable substrates include metallic substrates such as, for example, steel, cast steel, stainless steel, aluminium, cast aluminium or hot dip galvanized steel. For improved adhesion, the substrate may be roughened by sandblasting or sanding. Application of a primer is also possible to improve adhesion. Nonmetallic substrates such as glass, plastics, or inorganic substrates such as ceramics, stoneware, concrete etc., may also be employed.

The inventive compositions and comparative compositions applied atop the substrate then undergo curing by reaction of the respective reactive groups/by influx of atmospheric humidity. A combined forced drying at elevated temperature with simultaneous chemical crosslinking is likewise possible.

Employed Chemicals and Raw Materials:

Tables 1 and 2 list the employed materials.

All siloxanes A1-A8 were produced by a process according to the description on page 4, line 5—page 5, line 4 based on EP 2 176 319 B1 or EP 2 159 248 B1.

The features of the inventive siloxanes are listed in Table 1.

TABLE 1

Employed siloxanes of formula (I)

| No. | Structure | Modification | $R^2$ | Number | | | | | | Factors | | Viscosity* | Molecular weight** |
|---|---|---|---|---|---|---|---|---|---|---|---|---|---|
| | | | | a | a1 | b | b1 | c | d | F1 | K | | |
| A1 | Mono-T | terminal | propyl glycidyl ether | 0 | 3 | 96 | 0 | 1 | 0 | 32 | 3 | 165 | 7700 |
| A2 | Mono-T | lateral | hydroxyethylpropyl ether | 3 | 0 | 150 | 6 | 1 | 0 | 52 | 3 | 172 | 12 400 |
| A3 | Mono-Q | terminal | ethyltrimethoxysilyl | 0 | 4 | 95 | 0 | 0 | 1 | 23.8 | 4 | 110 | 8000 |
| A4 | Mono-Q | lateral | dodecyl | 4 | 0 | 187 | 8 | 0 | 1 | 48.8 | 4 | 124 | 15 500 |
| A5 | Multi-T | terminal | propyl glycidyl ether | 0 | 9 | 184 | 0 | 7 | 0 | 12.3 | 1.3 | 92 | 15 600 |
| A6 | Multi-T | lateral | ethyltrimethoxysilyl | 9 | 0 | 375 | 9 | 7 | 0 | 25.6 | 1.3 | 677 | 30 800 |
| A7 | Multi-Q | terminal | hydroxyethylpropyl ether | 0 | 9 | 388 | 0 | 0 | 3.5 | 33.7 | 2.6 | 248 | 30 400 |
| A8 | Multi-Q | lateral | aminopropyl | 9 | 0 | 366 | 20 | 0 | 4 | 29.7 | 2.5 | 450 | 30 500 |

$R^1$ in A1 to A8 = methyl

*values in mPa · s (25° C.), measured according to DIN 53015
**values in g/mol, rounded

TABLE 2

Further employed chemicals and materials

| Trade name | Manufacturer | Use |
|---|---|---|
| SILIKOPON ® EF | Evonik Industries AG or one of its subsidiaries | film-forming polymer |
| SILIKOTOP ® E901 | Evonik Industries AG or one of its subsidiaries | film-forming polymer |
| VESTANAT ® EP-MF 201 | Evonik Industries AG or one of its subsidiaries | film-forming polymer |
| Araldite ® GZ 7071 | Huntsman Corporation | film-forming polymer |
| SETAL ® 1603 | Allnex SA/NV | film-forming polymer |
| Aradur ® 450 | Huntsman Corporation | curing agent |
| DYNASYLAN AMEO | Evonik Industries AG or one of its subsidiaries | curing agent |
| VESTANAT ® HT 2500 LV | Evonik Industries AG or one of its subsidiaries | curing agent |
| DESMODUR N 3600 | Covestro AG | curing agent |
| DMS-C21 | Gelest Inc. | linear, hydroxyl-terminated siloxane |
| DMS-E21 | Gelest Inc. | linear, epoxy-terminated siloxane |
| methoxypropyl acetate | Sigma Aldrich | solvent |
| propylene glycol | Sigma Aldrich | solvent |
| butyl acetate | Sigma Aldrich | solvent |
| xylene | Sigma Aldrich | solvent |
| Hydrosol A 170 | DHC Solvent Chemie GmbH | solvent |
| TIB KAT ® 218/318/716 | TIB Chemicals AG | catalyst |
| TEGO ® Airex 900/990 | Evonik Industries AG or one of its subsidiaries | defoamer |
| TEGO ® Dispers 670 | Evonik Industries AG or one of its subsidiaries | dispersing additive |

TABLE 2-continued

Further employed chemicals and materials

| Trade name | Manufacturer | Use |
|---|---|---|
| TEGO ® Glide 100 | Evonik Industries AG or one of its subsidiaries | surface additive |
| TEGO ® Flow 425 | Evonik Industries AG or one of its subsidiaries | surface additive |
| THIXATROL ® ST | Elementis Specialities, Inc. | rheology additive |
| KRONOS ® 2360 | Kronos Titan GmbH | pigment |
| Blanc Fix Micro | Sachtleben Chemie GmbH | filler |
| Tinuvin ® 400 | BASF SE | light stabilizer |
| Tinuvin ® 292 | BASF SE | light stabilizer |

Example 1: Production of the Coatings

Inventive Clear Lacquer Coatings (B1-B5, B7-B10):

The constituents of the inventive compositions B1 to B5 and B7 to B10 were weighed in the amounts listed in table 3, without the curing agents and catalysts, into a 185 ml PP screw-cap container (Dürrmann GmbH & Co KG, 85664 Hohenlinden) and using a Speedmixer (Hauschild Engineering, Type DAC 150 FVZ) stirred in for 1 minute at 2000 revolutions per minute. After a standing time of 10 minutes the curing agents and catalysts were added and using a Speedmixer again stirred in for 1 minute at 2000 revolutions per minute.

Inventive White Lacquer Coating (B6):

For production of the inventive white lacquer coating 30 g of SILIKOPON EF and also the components A2, A5, Tego Airex 900, Tego Dispers 670, Thixatrol ST, Kronos 2360, Blanc fixe micro and xylene as per table 3 were weighed into a 250 ml glass bottle and dispersed for 2 h using a Skandex Disperser (Lau DAS 200). Subsequently a further 25 g of SILIKOPON EF and also the components butyl acetate, Tinuvin 292 and Tinuvin 400 as per table 3 were stirred in for 1 minute at 2000 revolutions per minute with a Speedmixer (Hauschild Engineering, Type DAC 150 FVZ). After one day of maturation the colour paste was mixed with Dynasylan AMEO and TibKat 318.

Comparative Coatings (VB1-VB7):

The comparative coatings VB1 to VB4 and also VB6 and VB7 are produced analogously to the inventive clear lacquer coatings. VB5 is produced analogously to the inventive white lacquer coating. VB1, VB2, VB5 and VB6 are standard lacquer systems without addition of siloxanes. In the case of VB3, VB4 and VB7 a linear difunctional siloxane was added. The amounts of the component are listed in table 4.

Application

After a short resting time of 5 minutes for assessment of film properties the inventive coatings B1 to B10 and comparative coatings VB1 to VB7 were applied at RT using a four-way bar coater (100 µm, Simex) to glass sheets cleaned with isopropanol (Gläserei Glänzer, dimensions: 90×150×5 mm) and dried at RT; furthermore, PVC Panels (200×400×5 mm, cat. no.:4364002858, KVG Kunststoff Betriebs GmbH) previously pretreated with a primer for better adhesion were coated by spray application. Furthermore, aluminium test sheets (Q-PANEL Type A, 152×102×0.64 mm) previously pretreated with a primer for better adhesion were coated by spray application. To measure ice adhesion stainless steel sheets having dimensions of 100×40×15 mm (fabricated in-house) and previously pretreated with a primer for better adhesion were coated by spray application.

The necessary spray viscosities were established by dilution with xylene (isomeric mixture) or butyl glycol. Finally, drying was carried out for 24 hours at RT in drying cabinets intended therefor. All further measurements and tests were performed after at least seven days of storage at room temperature.

TABLE 3

Formulation for producing inventive coatings B1 to B10

| | B1 | B2 | B3 | B4 | B5 | B6 | B7 | B8 | B9 | B10 |
|---|---|---|---|---|---|---|---|---|---|---|
| A1 (g) | | | | | | | | | 3 | |
| A2 (g) | | | 5 | | | 5 | | 2.5 | | |
| A3 (g) | | | | | | | | | | 2.5 |
| A4 (g) | 10 | | | | | | | | | |
| A5 (g) | | | | | 5 | 4 | | | | |
| A6 (g) | | | | 4 | | | | | | |
| A7 (g) | | 9 | | | | | 8 | | | |
| A8 (g) | | | | | 10 | | | | | |
| SILIKOPON ® EF (g) | 93.6 | | | | 93.6 | 55 | | | 93.6 | |
| SILIKOTOP E901 (g) | | 81.9 | | | | | | | | |
| VESTANAT ® EP-MF 201 (g) | | | 89 | | | | | | | 89 |
| ARALDITE ® GZ 7071 (g) | | | | 80 | | | | | | |
| SETAL ® 1603 (g) | | | | | | | 72.2 | 72.2 | | |
| ARADUR ® 450 (g) | | | | 14.4 | | | | | | |
| DYNASYLAN AMEO (g) | 22 | | | | 22 | 13 | | | 2.9 | |

TABLE 3-continued

Formulation for producing inventive coatings B1 to B10

| | B1 | B2 | B3 | B4 | B5 | B6 | B7 | B8 | B9 | B10 |
|---|---|---|---|---|---|---|---|---|---|---|
| VESTANAT ® HT 2500 LV (g) | | 55 | | | | | | | | |
| DESMODUR N3600 (g)*** | | | | | | | 39.7 | 39.7 | | |
| Methoxypropyl acetate (g) | | 3.2 | | | | | | | | |
| Propylene glycol (g) | | 0.5 | | | | | | | 4.9 | |
| Butyl acetate (g) | 6.8 | 5.4 | | | 6.8 | 2 | | | | |
| Xylene (g) | | | 10 | 5.6 | | 1 | 15.3 | 15.3 | | 10 |
| Hydrosol A170 | | | | | | | 1.4 | 1.4 | | |
| TEGO ® Glide 100** (g) | | 1 | 0.5 | | | | | | | 0.5 |
| TIB KAT ® 218* (g) | | 6.5 | | | | | | | 22 | |
| TIB KAT ® 716* (g) | | | | | | | 11 | 11 | | |
| TIB KAT ® 318 (g) | 1 | | | | 1 | 1.65 | | | | |
| TEGO ® Airex 900 (g) | | | | | | 1 | | | | |
| TEGO ® Dispers 670 (g) | | | | | | 1 | | | | |
| THIXATROL ® ST (g) | | | | | | 1 | | | | |
| Blanc Fixe Micro (g) | | | | | | 7 | | | 0.5 | |
| Tinuvin ® 292 (g) | 0.5 | 0.5 | 0.5 | | | 0.5 | 0.5 | | 1.0 | 0.5 |
| Tinuvin ® 400 (g) | 1.0 | 1.0 | | | | 1.0 | 1.0 | | | |
| KRONOS ® 2360 (g) | | | | | | 30.5 | | | | |
| TEGO ® Airex 990 (g) | | 1.15 | | | | | 0.1 | 0.1 | | |

*1% dissolved in butyl acetate
**10% dissolved in butyl acetate
***90% dissolved in butyl acetate

TABLE 4

Formulation for producing comparative coatings VB1-VB7

| | VB1 | VB2 | VB3 | VB4 | VB5 | VB6 | VB7 |
|---|---|---|---|---|---|---|---|
| SILIKOPON ® EF (g) | 93.6 | | 93.6 | | 55 | | |
| DMS-C21 (g) | | | | 10 | | | 10 |
| DMS-E21 (g) | | | | | 10 | | |
| VESTANAT ® EP-MF 201 (g) | | 81.9 | | 81.9 | | | |
| SETAL 1603 (g) | | | | | | 72.2 | 72.2 |
| Methoxypropyl acetate (g) | | 3.2 | | 3.2 | | | |
| Propylene glycol (g) | | 0.5 | | 0.5 | | | |
| Butyl acetate (g) | 6.8 | 5.4 | 6.8 | 5.4 | 2 | | |
| Xylene (g) | | | | | 2 | 15.3 | 15.3 |
| Hydrosol A170 | | | | | | 1.4 | 1.4 |
| TEGO ® Glide 100** (g) | | 1 | | 1 | | | |
| TIB KAT ® 218* (g) | | 6.5 | | 6.5 | | | |
| TIB KAT ® 716* (g) | | | | | | 11 | 11 |
| DANYSYLAN AMEO (g) | 22 | | 22 | | 13 | | |
| TibKat318 (g) | 1 | | 1 | | 0.65 | | |
| VESTANAT ® HT 2500 LV (g) | | 55 | | 55 | | | |
| DESMODUR N3600 (g)*** | | | | | | 39.7 | 39.7 |
| TEGO ® Airex 900 (g) | | | | | 1 | | |
| TEGO ® Dispers 670 (g) | | | | | 1 | | |
| THIXATROL ® ST (g) | | | | | 1 | | |
| Blanc Fixe Micro (g) | | | | | 7 | | |
| Tinuvin ® 292 (g) | 0.5 | 0.5 | 0.5 | 0.5 | 0.5 | | |
| Tinuvin ® 400 (g) | 1.0 | 1.0 | 1.0 | 1.0 | 1.0 | | |
| KRONOS ® 2360 (g) | | | | | 30.5 | | |
| TEGO ® Airex 990 (g) | | 1.15 | | 1.15 | | 0.1 | 0.1 |

*1% dissolved in butyl acetate
**10% dissolved in butyl acetate
***90% dissolved in butyl acetate Example 2: Assessment of Coating 2.1 Drying Time Measurements Drying time was performed using a BK3 Drying Recorder (The Mickle Laboratory Engineering Co. Ltd., Goose Green, Gomshall, Guildford, Surrey GUS 911, UK) according to ASTM D5895. In this procedure the produced coatings were applied to standard glass strips (30×2.5 cm×2 mm) using a four-way bar coater (Erichsen Model 360, wet film layer thickness 100 μm). The standard glass strips were previously freed of dust and adhering dirt and grease with acetone and subsequently with an ethanol/DM water mixture. Using a lever on the reverse, the slide was then shifted leftwards into the start position. The scoring scribes were then folded down onto the sample glass plates. The test duration was set to 6, 12 or 24 hours, and measurement was commenced. After the end of the test duration, the scoring scribes were folded up and the glass plates were removed for assessment. The instants of initial drying and volume drying were read off using the associated timescale.

2.2 Hardness Measurement

A suitable procedure for assessment of the hardness of the inventive coatings and the comparative coatings is the pendulum damping test according to König or Persoz and defined in DIN EN ISO 1522. The hardnesses were measured according to this test method by means of a pendulum hardness instrument (model 299/300, Erichsen GmbH & Co. KG). To this end, aluminium test sheets (Q-PANEL Type A, 152×102×0.64 mm) previously pretreated with a primer for better adhesion were coated by spray application with the respective coatings. The coated aluminium test sheets were inserted into the pendulum hardness instrument and the pendulum was allowed to oscillate. After termination of the tests the value determined by the instrument was read off.

Table 5 shows evaluation of the coatings in respect of drying time, appearance and hardness.

TABLE 5

Evaluation of drying time, appearance and hardness

| | Drying time [h] | Appearance | Hardness* | | Drying time [h] | Appearance | Hardness* |
|---|---|---|---|---|---|---|---|
| B1 | <12 | 2 | 128 | VB1 | <12 | 1 | 132 |
| B2 | <12 | 2 | 71 | VB2 | <12 | 1 | 80 |
| B3 | <6 | 2 | 113 | VB3 | <12 | 2 | 83 |
| B4 | <12 | 2 | 105 | VB4 | <12 | 2 | 35 |
| B5 | <24 | 2 | 117 | VB5 | <12 | 1 | 121 |
| B6 | <12 | 1 | 108 | VB6 | <12 | 1 | 128 |
| B7 | <12 | 2 | 113 | VB7 | <12 | 3 | 69 |
| B8 | <12 | 1 | 120 | | | | |
| B9 | <12 | 1 | 126 | | | | |
| B10 | <6 | 1 | 134 | | | | |

*Number of oscillations, measured according to DIN EN ISO 1522

Visual assessment of coating:
1=very good, uniform application, defect-free, clear;
2=good, uniform application, largely defect-free, clear or cloudy,
3=not ok, nonuniform application, many defects In respect of drying time the inventive coatings show little difference to the comparative examples. In addition they show a higher hardness compared to the comparative coatings VB3, VB4 and VB7 and are therefore more resistant to mechanical stress.

Example 3: Measurement and Evaluation of the Coating in Respect of the Anti-Adhesive Property 3.1 Determination of Anti-Fouling Property To test the compositions in respect of their activity for preventing biofouling in brine the coatings produced in example 1 were applied atop PVC panels analogous to those described above and these were transported to the North Sea (Hooksiel/Norderney) for static exposure experiments.

The exposure of the coated PVC test panels (inventive coatings B1-B7, comparative coatings VB1-VB7) having dimensions of 20×40 cm was effected over the period from beginning of March 2017 to beginning of October 2017 at a depth of 20 cm below the water surface. Every 2 months, the test panels were subjected to visual examination and assessed with regard to the overgrowth. In addition, a commercial rubber squeegee (rubber window lip) was wiped over a 10 cm strip in the lower region of the test panel without pressure, once from right to left and then from left to right, in order to ascertain the removability of the overgrowth.

The overall assessment was effected by means of a scale as shown below of
0=no overgrowth
1=minimal overgrowth, very easy to remove
2=slight overgrowth, very easy to remove
3=moderate overgrowth, distinct residues
4=severe overgrowth, significant residues
5=very severe overgrowth, not removable.

TABLE 6

Results of exposure experiments

| Coating | March | May | July | September | October |
|---|---|---|---|---|---|
| B1 | 0 | 0 | 0 | 1 | 1 |
| B2 | 0 | 0 | 1 | 2 | 2 |
| B3 | 0 | 0 | 1 | 2 | 2 |
| B4 | 0 | 0 | 1 | 1 | 2 |
| B5 | 0 | 0 | 0 | 1 | 2 |
| B6 | 0 | 0 | 1 | 2 | 2 |
| B7 | 0 | 0 | 1 | 1 | 2 |
| VB1 | 0 | 2 | 3 | 4 | 5 |
| VB2 | 0 | 2 | 3 | 4 | 5 |
| VB3 | 0 | 1 | 1 | 2 | 3 |
| VB4 | 0 | 1 | 1 | 2 | 3 |
| VB5 | 0 | 2 | 3 | 4 | 5 |
| VB6 | 0 | 2 | 3 | 4 | 5 |
| VB7 | 0 | 1 | 1 | 2 | 3 |

The coatings having the inventive compositions B1-B7 showed a light overgrowth which was very easy to remove after elapsing of the test period.

3.2 Determination of Water Contact Angle

The water contact angle may be suitably measured by means of a contact angle measuring instrument. To determine the water contact angle of the inventive coatings and the comparative coatings, measurements were performed by means of an OCA 20 contact angle measuring instrument (DataPhysics Instruments GmbH, Raiffeisenstraße 34, 70794 Filderstadt, Germany) using SCA 20 software from the same manufacturer. Coated aluminium test sheets having the coatings B1-B10 and VB1 to VB7 were inserted into the contact angle measuring instrument and droplets of 5 µl were dropped onto the coating. The contact angle was measured using the software directly after dropping and after a waiting time of one minute.

TABLE 7

Results of water contact angle test

| | WCA | WCA' | | WCA | WCA' |
|---|---|---|---|---|---|
| B1 | 98 | 95 | VB1 | 81 | 79 |
| B2 | 99 | 95 | VB2 | 78 | 76 |
| B3 | 93 | 91 | VB3 | 89 | 86 |
| B4 | 97 | 94 | VB4 | 91 | 87 |
| B5 | 100 | 98 | VB5 | 78 | 75 |
| B6 | 95 | 92 | VB6 | 70 | 68 |
| B7 | 93 | 90 | VB7 | 85 | 83 |
| B8 | 89 | 87 | | | |
| B9 | 95 | 94 | | | |
| B10 | 88 | 86 | | | |

WCA = water contact angle directly after dropping in °
WCA' = water contact angle one minute after dropping in °

It was found that the inventive coatings show a larger WCA value than those of the comparative coatings. The inventive coatings thus exhibit a higher anti-adhesion activity.

3.3 Determination of Anti-Graffiti Property Using Edding Test

To test the anti-graffiti property of the coatings the applied aluminium test sheets having the respective coatings B8 to B10 and the comparative coatings VB1, VB3, VB5, VB6, and VB7 were written upon with an Edding 400 permanent marker. It was tested whether the ink wets the coatings or beads to form droplets. After the ink had dried attempts were made to remove it with a dry paper towel.

The overall assessment was effected by means of a scale as shown below of:

1=Ink does not wet substrate and forms droplets; may be residuelessly removed with a paper towel.

2=Ink partly wets substrate and forms droplets; may be residuelessly removed with a paper towel.

3=Ink fully wets substrate; may be residuelessly removed with a paper towel.

4=Ink fully wets substrate; may be only partly removed with a paper towel.

5=Ink fully wets substrate; cannot be removed.

TABLE 8

Results of Edding test

| | Edding test | | Edding test |
|---|---|---|---|
| B8 | 1 | VB1 | 4 |
| B9 | 1 | VB3 | 2 |
| B10 | 1 | VB5 | 4 |
| | | VB6 | 5 |
| | | VB7 | 3 |

The inventive coatings show an anti-graffiti property.

3.4 Determination of Easy-to-Clean Property

A suitable procedure for determining the easy-to-clean property is testing the inventive coatings with a 2% carbon black solution in DM water. The carbon black solution was produced from 98 parts of demineralized water and 2 parts of Special black 4 from Orion Engineered Carbons and this mixture was dispersed for 5 minutes at the spray limit using a Dispermat. The carbon black solution was applied in 5 strokes with light pressure atop the coated aluminium test sheets having the coatings B8 to B10 and VB1, VB3, VB5, VB6, and VB7 using a 1" flat brush with China bristles. The thus pretreated sheets were dried at 50° C. for 1 h in an oven. The long edge of the sheets was then vigorously struck against the bench to determine how much soiling could be knocked off. The remaining soiling was wiped off with a dry Torck paper towel and the gloss reduction and discoloration were then visually assessed.

The overall assessment was effected by means of a scale as shown below of

1=No carbon black remains on the sheet after knocking off. No gloss reduction or discoloration visible.

2=A little carbon black remains on the sheet after knocking off. The carbon black may be residuelessly removed with the paper towel. No gloss reduction or discoloration visible.

3=Carbon black remains on the sheet after knocking off. The carbon black can be removed with the paper towel with the exception of a few residues. A slight gloss reduction or discoloration is visible.

4=Carbon black remains on the sheet after knocking off. Distinct carbon black residues are visible after cleaning with the paper towel. A severe gloss reduction or discoloration is visible.

5=The carbon black cannot be knocked off nor wiped off with the paper towel. A severe gloss reduction or discoloration is visible.

TABLE 9

Results of easy-to-clean test

| | Carbon black adhesion | | Carbon black adhesion |
|---|---|---|---|
| B8 | 1 | VB1 | 4 |
| B9 | 2 | VB3 | 3 |
| B10 | 1 | VB5 | 4 |
| | | VB6 | 5 |
| | | VB7 | 3 |

3.5 Determination of Anti-Icing Property

Method of Measurement for Ice Adhesion

The adhesion of ice to coated substrates is determined quantitatively via the force F needed to remove ice adhering to the coated substrate over a contact area A between the ice and the substrate. The adhesion r is calculated by the formula $\tau = F/A$, wherein $\tau$ has the unit of mechanical stress (Pa). This determination requires a substrate comprising the coating to be tested, a cooling system to produce and maintain the ice from water, a container containing water to be frozen and thereafter the frozen ice, and also an apparatus which exerts and measures the force F as a function of time t.

FIG. 1 shows a sectional view through the adhesion site.

In the present set-up 1, the coating is realized via a stainless steel plate 13 measuring 100×40×15 mm³. The stainless steel plate 13 has four drilled holes for securing the stainless steel plate 13 to a heat sink 11. The coating to be tested is applied atop the stainless steel plate 13 using methods known to a person skilled in the art. Methods may be, for example, spray application, blade coating or roller coating.

Cooling is realized via a Peltier device 12 having an area of 40×40 mm². The coated stainless steel plate 13 is secured to the abovementioned heat sink 11 using the drilled holes with nuts and bolts such that the abovementioned Peltier device 12 is clamped between the stainless steel plate 13 and the heat sink 11. The Peltier device 12 is connected such that it is the cold side of the device 12 which is in contact with the stainless steel plate 13 and the warm side which is in contact with the heat sink 11. Heat transfer between the two contact areas mentioned is established using a heat-conducting paste. In the present set-up 1, the Peltier device 12 is a QC-127-1.4-8.5MS device from Quick-Ohm Kupper & Co. GmbH Wuppertal having a maximum operating voltage of 15.5 V, a maximum operating current of 8.5 A and a specified maximum power rating of 72 W.

A container 14 is realized via a typical laboratory pipette tip made of transparent plastic. The pipette tip has a diameter of 13.5 mm at the wide opening. The narrow opening is removed to leave a hollow truncated cone about 30 mm in length. The resultant container is placed on the stainless steel plate 13 with the wide opening down and filled with water, preferably demineralized or demineralized and deionized, up to a fill level of about 10 mm. As soon as the Peltier device 12 is connected to a power source, the cold side of the Peltier device 12 cools down to a temperature of about −10° C. to −20° C. in the region of the pipette tip, as do—via the heat-conducting paste—the stainless steel plate 13 and hence also the coating to be tested. The heat-pumping function of the Peltier device 12 causes the water in the container 14 to cool down and to transition into the ice phase. The resulting ice adheres to the coating to be tested, and freezes solid.

The apparatus for measurement of F(t) (not depicted) is realized via a 1446 Universal Material Tester from Zwick GmbH & Co. KG Ulm. The measuring apparatus in the present set-up 1 is provided with a weighing cell (not shown) up to a maximum force absorption of 10 kN and also a moveable beam. The weighing cell is mounted to the moveable beam and provided with a planar metallic body. The mechanically solid combination of heat sink 11, switched-on Peltier device 12, stainless steel plate 13, container 14 and ice is moved into the moving path of the beam, such that the metallic body on the weighing cell shears off the ice and the container parallel to the surface of the stainless steel plate 13 and of the coating to be tested (force exertion as per 15). In the process, the weighing cell measures the force trajectory as a function of time F(t).

The $F_{max}$ maximum force measured over time corresponds to the force needed to shear off the ice parallel to the surface. The abovementioned diameter d of container 14 is used to compute the contact area A between the ice and the coating to be tested as $$A = \left(\frac{d}{2}\right)^2 \pi.$$

The quantitative value of ice adhesion computes as per formula (II). The run is repeated more than once (from four to nine times). The values are means of five to ten measurements.

Similar set-ups are known from, for example, Meuler et al. ACS Applied Materials & Interfaces 2010 2 (11), 3100-3110 (DOI: 10.1021/am1006035) or Raraty et al. Proc. R. Soc. Lond. A 1958 245 184-201 (DOI: 10.1098/rspa.1958.0076).

To test the anti-icing property of the coatings, the coatings B1, B3, B5 and B6 and the comparative coatings VB1, VB2, VB3, VB4 and VB7, all applied to the previously undercoated stainless steel sheets having dimensions of 100×40×15 mm, were tested with the above-described method.

TABLE 10

Results of the test for testing of ice adhesion

| | τ [kPa] | | τ [kPa] |
|---|---|---|---|
| B1 | 47 | VB1 | 431 |
| B3 | 32 | VB2 | 321 |
| B5 | 18 | VB3 | 87 |
| B6 | 29 | VB4 | 118 |
| | | VB7 | 96 |

The method of measurement described above for ice adhesion was used to determine the adhesion of the coatings according to formula (II)

$$\tau = \frac{F}{A},$$

wherein adhesion has the unit of mechanical stress (Pa).

An adhesion value of below 50 kPa indicates a very good anti-icing property.

3.6 Determination of Biofilm-Inhibiting Effect

To test the compositions for their activity in inhibiting biofilms under laboratory conditions, the coatings B1-B6 and B1*-B6* produced under example 1, and also the comparative coatings VB1-VB6 and VB1*-VB6*, respectively, were applied to glass slides, in analogy to the description as above.

Drinking-water bacteria were used as reference organisms for the bacterial suspension.

3.6.1 Preparation of the Bacterial Suspension Stock Solution

The bacteria in question were the autochthonous microflora which formed from the drinking water with 24±4 hours at 30° C. on addition of Caso broth (3 g/l sterile drinking water, from Merck KGaA Millipore). The cell count in this bacterial suspension stock solution was determined using a Thoma counting chamber.

3.6.2 Preparation of the Bacterial Suspension Working Solution

The bacterial suspension stock solution was diluted such that 1.8 L of Caso broth (1.5 g/l sterile drinking water) contained a cell count of $5 \times 10^6$ bacteria/ml.

The bacterial suspension working solution thus prepared was introduced into a 2 L glass beaker containing 24 coated glass slides (in inventive coatings B1-B6 and B1*-B6*, comparative coatings VB1-VB6 and VB1*-VB6*, respectively) fixed vertically in a steel ring. In the middle there was a magnetic stirrer rod which mixed the bacterial suspension working solution. The beaker stood on a magnetic heating plate, set such that the temperature of the bacterial suspension working solution was 30° C.

The coated glass slides were removed after three and seven days. The loosely adhering bacteria were washed off under the running tap with deionized water. After washing, the coated glass slides were investigated for formation of biofilm. The visual evaluation took place in a scanning electron microscope (Hitachi Tabletop microscope TM4000Plus) at 200 and 2000 times magnification.

The overall evaluation was made using a scale as shown below:
0=no biofilm
1=minimal biofilm
2=slight biofilm
3=moderately severe biofilm
4=severe biofilm

TABLE 6

Results for the biofilm-inhibiting effect

| Coating | 0 days | 3 days | 7 days |
|---|---|---|---|
| B1 | 0 | 0 | |
| B1* | | | 1 |
| B2 | 0 | 1 | |
| B2* | | | 2 |
| B3 | 0 | 1 | |
| B3* | | | 1 |
| B4 | 0 | 1 | |
| B4* | | | 2 |
| B5 | 0 | 1 | |
| B5* | | | 2 |
| B6 | 0 | 0 | |
| B6* | | | 1 |
| VB1 | 0 | 3 | |
| VB1* | | | 4 |
| VB2 | 0 | 3 | |
| VB2* | | | 4 |
| VB3 | 0 | 2 | |
| VB3* | | | 3 |
| VB4 | 0 | 1 | |
| VB4* | | | 3 |
| VB5 | 0 | 3 | |
| VB5* | | | 4 |
| VB6 | 0 | 3 | |
| VB6* | | | 4 |

The coated glass slides with the inventive compositions B1-B6 and B1*-B6* showed a slight biofilm after 3 or 7 days.

The invention claimed is:

1. A curable composition, comprising: a film-forming polymer and an organo-modified, branched siloxane of formula (I) or mixtures thereof:

$$M_a M'_{a1} D_b T_c Q_d \quad \text{Formula (I)}$$

where:
$M=(R^1_3 SiO_{1/2})$
$M'=(R^2 R^1_2 SiO_{1/2})$
$D=(R^1_2 SiO_{2/2})$
$T=(R^3 SiO_{3/2})$
$Q=(SiO_{4/2})$
a=from 0 to 30,
a1=from 0 to 30, wherein a+a1>2,
b=from 10-1000,
c=from 0 to 30,
d=from 0 to 15, wherein c+d>=1,
$R^1$=independently of one another hydrocarbon radicals having 1 to 30 carbon atoms,
$R^2$ is selected from the group consisting of organic polyether, hydroxyl, amine, carboxyl, alkoxy, epoxy, alkylalkoxysilylalkyl and alkoxysilylalkyl radicals,
$R^3=R^1$ or $R^2$,
wherein the average degree of branching K of the siloxanes according to formula (I) is greater than 1,
wherein the siloxanes of formula (I) have an average number of directly successive D units F1=D/(1+T*2+Q*3)=of at least 5,
wherein the siloxane has a number-average molecular weight of 5,000-50,000,
wherein the siloxane comprises at least one $R^2$ group,
wherein the siloxanes of formula (I) are organo-modified siloxanes singly or multiply branched in the siloxane part, and
wherein the film-forming polymer is an epoxy-functional silane or siloxane, aromatic or aliphatic glycidyl ethers or condensates thereof or mixtures thereof reactive with an amine-containing curing agent, or wherein the film-forming polymer is a film-forming alkoxysilyl-containing polymer which cures by the mechanism of hydrolysis condensation, optionally in combination with at least one catalyst,
wherein the siloxanes of formula (I) have terminal and/or lateral organic radicals selected from OH-bearing organic radicals, carboxylate groups, alkoxysilylalkyl groups, dodecyl groups or aminoalkyl groups, and
wherein the OH-bearing organic radicals are present and comprise hydroxyethylpropyl groups.

2. The curable composition according to claim 1, wherein the average degree of branching K of the siloxanes according to formula (I) is greater than 1.25.

3. The curable composition according to claim 1, wherein the siloxanes of formula (I) have an average number of directly successive D units F1=D/(1+T*2+Q*3)=of at least 10.

4. The curable composition according to claim 1, wherein the siloxanes of formula (I) have a viscosity measured according to DIN 53015 of from 50-2000 mPa s (25° C.).

5. The curable composition according to claim 1, wherein the film-forming polymer is selected from the group of epoxy-functional siloxane, aromatic or aliphatic glycidyl ethers or condensates thereof or mixtures thereof reactive with an amine-containing curing agent.

6. The curable composition according to claim 1, wherein the film-forming polymer is a film-forming alkoxysilyl-containing polymer which cures by the mechanism of hydrolysis condensation, optionally in combination with at least one catalyst.

7. The curable composition according to claim 1, wherein the siloxanes of formula (I) are employed in concentrations of from 0.1% by weight to 40% by weight based on the curable composition.

8. The curable composition according to claim 1, wherein the siloxanes of formula (I) are employed in concentrations of from 2% by weight to 20% by weight based on the curable composition.

9. The curable composition according to claim 5, wherein the siloxane is present in the curable film-forming composition in an amount from 2% by weight to 20% by weight.

10. A coating having anti-adhesive properties, containing the composition as defined in claim 1.

11. A coating having anti-soiling properties, containing the composition as defined in claim 1.

12. A coating having anti-graffiti properties, containing the composition as defined in claim 1.

13. A coating having anti-icing properties, containing the composition as defined in claim 1.

14. A coating having anti-fouling properties, containing the composition as defined in claim 1.

15. A universal anti-adhesive additive containing the composition as defined in claim 1.

16. An anti-fouling additive, containing the composition as defined in claim 1.

17. An anti-soiling additive, containing the composition as defined in claim 1.

18. An anti-icing additive, containing the composition as defined in claim 1.

19. An anti-graffiti additive, containing the composition as defined in claim 1.

20. The curable composition according to claim 1, wherein variable a is not zero.

21. The curable composition according to claim 1, wherein variable d is not zero.

22. The curable composition according to claim 1, comprising a mixture of the organo-modified, branched siloxanes of formula (I).

23. The curable composition according to claim 1, wherein $R^1$ is phenyl dodecyl, or hexadecyl.

24. The curable composition according to claim 1, wherein variable a1 is not zero.

25. The curable composition according to claim 1, wherein variable c is not zero.

26. The curable composition according to claim 1,
wherein formula (I) is an organo-modified siloxane singly branched in the siloxane part.

27. The curable composition according to claim 26,
wherein formula (I) has a viscosity measured according to DIN 53015 of from 100-1500 mPa s (25° C.), and wherein the film-forming polymer is a film-forming alkoxysilylcontaining polymer which cures by the mechanism of hydrolysis condensation, in combination with at least one catalyst.

28. The curable composition according to claim 1,
wherein the film-forming polymer is selected from the group consisting of epoxy-functional silane or siloxane, aromatic or aliphatic glycidyl ethers or condensates thereof and mixtures thereof reactive with an amine-containing curing agent.

29. The curable composition according to claim 1, wherein the film-forming polymer is a film-forming alkoxysilyl-containing polymer which cures by the mechanism of hydrolysis condensation, in combination with at least one catalyst.

30. A coating comprising the curable composition according to claim 1 wherein the coating has anti-adhesive properties, anti-soiling properties, anti-graffiti properties, anti-icing properties or anti-fouling properties.

31. An additive comprising the curable composition of claim 1, wherein the additive is a universal anti-adhesive additive, an anti-fouling additive, anti-soiling additive, anti-icing additive or anti-graffiti additive.

32. A process for forming an anti-adhesive coating on a substrate comprising applying a curable film-forming composition according to claim 1 atop a substrate.

33. The process according to claim 32, wherein the siloxane (b) has a number-average molecular weight of 7000-35 000 g/mol.

34. The process according to claim 32, wherein the siloxane (b) is present in the curable film-forming composition in an amount from 0.1% by weight to 40% by weight.

35. The process according to claim 32, wherein the curable film-forming composition is cured at ambient temperature.

36. The process according to claim 32, wherein the substrate contains metal, concrete, wood, plastic and/or glass fiber and/or carbon fiber composite.

37. The process according to claim 36, wherein the substrate comprises a ship's hull, underwater structures and/or oil drilling platforms.

38. The process according to claim 32, wherein an undercoat and/or film-forming top coat composition is applied atop the substrate before application of the curable film-forming composition.

39. The curable composition according to claim 1, wherein a is 0 to 12.

40. The curable composition according to claim 1, wherein a1 is more than 0 and less than or equal to 12.

41. The curable composition according to claim 1, wherein $R^1$ is methyl, ethyl, phenyl, dodecyl or hexadecyl.

42. The curable composition according to claim 1, wherein $R^3$ is methyl, phenyl or alkoxy radicals.

43. The curable composition according to claim 1, wherein the siloxanes of formula (I) are or multiply branched in the siloxane part.

* * * * *